United States Patent
Kim et al.

(10) Patent No.: US 12,299,234 B2
(45) Date of Patent: May 13, 2025

(54) TOUCH INPUT DEVICE AND METHOD WITH DETERMINATION OF FLOATING GROUND STATE

(71) Applicant: HiDeep Inc., Seongnam-si (KR)

(72) Inventors: Bonkee Kim, Seongnam-si (KR);
Seyeob Kim, Seongnam-si (KR);
Joohyun Go, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 18/472,336

(22) Filed: Sep. 22, 2023

(65) Prior Publication Data
US 2024/0103665 A1 Mar. 28, 2024

(30) Foreign Application Priority Data

Sep. 23, 2022 (KR) .................. 10-2022-0121071
Nov. 28, 2022 (KR) .................. 10-2022-0161091

(51) Int. Cl.
*G06F 3/041* (2006.01)
*G06F 3/044* (2006.01)

(52) U.S. Cl.
CPC ...... *G06F 3/041662* (2019.05); *G06F 3/0443* (2019.05); *G06F 3/0445* (2019.05); *G06F 3/0446* (2019.05)

(58) Field of Classification Search
CPC ............. G06F 3/041662; G06F 3/0443; G06F 3/0445; G06F 3/0446
See application file for complete search history.

(56) References Cited

U.S. PATENT DOCUMENTS

| | | | |
|---|---|---|---|
| 2009/0273570 A1* | 11/2009 | Degner | G06F 3/03543 345/173 |
| 2010/0073301 A1 | 3/2010 | Yousefpor et al. | |
| 2013/0176280 A1 | 7/2013 | Wu et al. | |
| 2015/0049043 A1* | 2/2015 | Yousefpor | G06F 3/04186 345/174 |
| 2015/0049044 A1 | 2/2015 | Yousefpor et al. | |
| 2015/0277619 A1* | 10/2015 | Goudarzi | G06F 3/04184 345/174 |
| 2018/0032174 A1 | 2/2018 | Lee et al. | |

FOREIGN PATENT DOCUMENTS

KR 2021-0141911 A 11/2021

OTHER PUBLICATIONS

European Search Report 23199078.9 Issued Jan. 23, 2024.

\* cited by examiner

*Primary Examiner* — Liliana Cerullo
(74) *Attorney, Agent, or Firm* — The Belles Group, P.C.

(57) ABSTRACT

Embodiments of the present invention relate to a touch input device and a touch driving method thereof, in more detail, it can determine a floating ground state of the touch input device and a magnitude (severity) of the floating ground state, it relates to a touch driving method thereof, which is a touch input device that can restore a touch signal detected in a floating ground state into a touch signal in a normal ground state.

8 Claims, 11 Drawing Sheets

| (a) | | | | | | | |
|---|---|---|---|---|---|---|---|
| 4 | 4 | -52 | 17 | -6 | 7 | 8 | 3 |
| -3 | -14 | -73 | 237 | 178 | 0 | -3 | -1 |
| -31 | -27 | 130 | 46 | 189 | 19 | -29 | -28 |
| -26 | -11 | 224 | 10 | 139 | -2 | -30 | -27 |
| -23 | -18 | 165 | 166 | 42 | -51 | -23 | -20 |
| 0 | 5 | -23 | 117 | -58 | -6 | 6 | 7 |
| 15 | 9 | -9 | -31 | -21 | 7 | 11 | 9 |
| 5 | 7 | -10 | -27 | -17 | 5 | 10 | 10 |
| -8 | -1 | 100 | 147 | 114 | -16 | -4 | -7 |

TOUCH INPUT DEVICE AND METHOD WITH DETERMINATION OF FLOATING GROUND STATE

CROSS-REFERENCE TO RELATED APPLICATIONS

This US non-provisional patent application claims priority under 35 USC § 119 of Korean Patent Application No. 10-2022-0121071, filed on Sep. 23, 2022 and Korean Patent Application No. 10-2022-0161091, filed on Nov. 28, 2022, the entire contents of which are hereby incorporated by reference.

BACKGROUND

Embodiments of the present invention relate to a touch input device and a touch driving method thereof. In detail, it is related to a touch input device and a touch driving method thereof, which is that a touch input device and its touch can determine a floating ground state of a touch input device and a magnitude (severity) of the floating ground state and modify the touch signal detected in the floating ground state into a touch signal in a normal ground state.

Various types of input devices are used to operate computing systems. For example, input devices such as buttons, keys, joysticks, and touch screens are used. Due to the easy and convenient operation of touch screens, the use of touch screens is increasing when operating computing system.

A touch sensor is a type of information input device and can be provided and used in a display panel. For example, a touch sensor may be attached to one side of a display panel or may be manufactured and used integrally with a display panel. The user can input information by touching a touch sensor while viewing the image displayed on the screen of a display panel.

The above problem occurs when a user touches a touch sensor and the user does not hold the touch input device, the touch sensor is mounted (floating ground state, floating GND state or LGM state), and the touch sensor is implemented at a single layer or double layer with a driving electrode and a receiving electrode. In this case, it is a phenomenon that a signal can be disappeared where normally the signal should be detected in the touch input device otherwise, the signal that is supposed to be detected is split and the signal is detected as being touched at more than one point.

SUMMARY

The problem to be solved by the present invention is to provide a touch input device and a touch driving method thereof that can distinguish whether the touch input device is in a normal ground (good ground) state or a floating ground (floating GND) state.

In addition, a touch input device and a touch driving method thereof are provided that can determine the level of floating ground (floating GND) state.

In addition, a touch input device and a touch driving method thereof are provided capable of restoring a receiving signal in a floating ground (floating GND) state to a receiving signal in a normal ground state (good ground).

In addition, a touch input device and a touch driving method thereof are provided that can restore a receiving signal in a floating ground (floating GND) state to a receiving signal in a normal ground state (good ground) with minimal additional driving time and power consumption.

According to an embodiment of the present invention, touch input device comprising: a touch sensor including a plurality of first electrodes and a plurality of second electrodes; and a control unit configured to control the touch sensor, wherein the plurality of first electrodes is arranged along a first direction, each of the first electrodes has a predetermined shape, and are arranged along a second direction different from the first direction, the plurality of second electrodes is arranged along a second direction, each of the second electrodes has a predetermined shape, and is arranged along the first direction, and the control unit controls the touch sensor to be driven as a predetermined driving mode in a random time period, wherein in the predetermined driving mode the control unit controls: a driving signal to be applied to at least one first electrode among the plurality of first electrodes, and to receive a receiving signal from at least one other first electrode to which the driving signal is not applied, or a driving signal to be applied to at least one second electrode among the plurality of second electrodes, and to receive a receiving signal from at least one other second electrode to which the driving signal is not applied.

Here, wherein the predetermined driving mode, the control unit comprises: controlling the driving signal to be applied to the at least one first electrode, and receiving a first receiving signal from the at least one other first electrode, wherein the touch input device is comprising a mode to control the driving signal to be applied to the at least one other first electrode, and receive a second receiving signal from the at least one first electrode, and wherein the control unit determines whether the touch input device is a floating ground state based on the first and second receiving signals.

Here, wherein the control unit determines whether the touch input device is in the floating ground state or in the normal ground state according to the signs of the first and second receiving signals.

Here, wherein the control unit determines the intensity of the floating ground state according to the magnitude of the first and second receiving signals.

Here, wherein the predetermined driving mode includes a mutual mode and a self-mode, wherein the mutual mode, the control unit controls a mutual driving signal to be applied to the plurality of first electrodes, and receive mutual receiving signals from the plurality of second electrodes, wherein the self-mode, the control unit controls a self-driving signal to be applied to each of the plurality of first electrodes and the plurality of second electrodes, and receive a self-receiving signal from each of the plurality of first electrodes and the plurality of second electrodes, and wherein the control unit restores the mutual receiving signal into a mutual receiving signal in a normal ground state based on the first and second receiving signals and self-receiving signals from the plurality of second electrodes.

Here, wherein the predetermined driving mode includes a mutual mode and a self-mode, wherein the mutual mode, the control unit controls a mutual driving signal to be applied to the plurality of first electrodes, and receives a mutual receiving signal from the plurality of second electrodes, wherein the predetermined driving mode comprises controlling the driving signal to be applied to the at least one second electrode, receiving a third receiving signal from the at least one other second electrode, controlling the driving signal to be applied to the at least one other second electrode, and further comprising receiving a fourth receiving signal from the at least one second electrode, and wherein the control unit restores the mutual receiving signal into a mutual receiving signal in a normal ground state based on the first to fourth receiving signals.

Here, the at least one first electrode and the at least one other first electrode are arranged to alternate along the first direction, and the at least one second electrode and the at least other second electrode are arranged to alternate along the second direction.

Here, the plurality of first electrodes and the plurality of second electrodes are disposed together on the same layer.

Here, the plurality of first electrodes and the plurality of second electrodes are disposed on different layers.

Other embodiment of the present invention provides the method of a touch driving of a touch input device, wherein the touch input device comprising a plurality of first electrodes and a plurality of second electrodes; and a control unit configured to control a touch sensor, the method comprises: causing the control unit to drive the touch sensor in a predetermined driving mode; and determining whether the touch input device is a floating ground state based on a receiving signal under the predetermined driving mode; wherein the predetermined driving mode comprises the control unit to control: a driving signal to be applied to at least one first electrode among the plurality of first electrodes, and to receive a receiving signal from at least one other first electrode to which the driving signal is not applied, or a driving signal to be applied to at least one second electrode among the plurality of second electrodes, and to receive a receiving signal from at least one other second electrode to which the driving signal is not applied.

Here, wherein the predetermined driving mode having a mode comprises: controlling the driving signal to be applied to the at least one first electrode, receiving a first receiving signal from the at least one other first electrode, controlling the driving signal to be applied to the at least one other first electrode, and receiving a second receiving signal from the at least one first electrode.

Here, wherein the driving mode includes a mutual mode and a self-mode, wherein the mutual mode, the control unit controls a mutual driving signal to be applied to the plurality of first electrodes, and receives a mutual receiving signal from the plurality of second electrodes, wherein the self-mode, the control unit controls a self-driving signal to be applied to each of the plurality of first electrodes and the plurality of second electrodes, and receives a self-receiving signal from each of the plurality of first electrodes and the plurality of second electrodes, and wherein the control unit restores the mutual receiving signal into a mutual receiving signal in a normal ground state based on the first and second receiving signals and self-receiving signals from the plurality of second electrodes.

Here, wherein the predetermined driving mode includes a mutual mode and a self-mode, wherein the mutual mode, the control unit controls a mutual driving signal to be applied to the plurality of first electrodes, and receives a mutual receiving signal from the plurality of second electrodes, wherein the predetermined driving mode comprises controlling the driving signal to be applied to the at least one second electrode, receiving a third receiving signal from the at least one other second electrode, controlling the driving signal to be applied to the at least one other second electrode, and further comprising receiving a fourth receiving signal from the at least one second electrode, and wherein the control unit restores the mutual receiving signal into a mutual receiving signal in a normal ground state based on the first to fourth receiving signals.

According to the touch input device having the above-described configuration in accordance with the embodiment of the present invention can distinguish whether the touch input device is in a normal ground (good ground) state or a floating ground (floating GND) state.

Also, the touch input device can determine the level of floating ground (floating GND) state.

Also, the touch input device can be capable of restoring a receiving signal in a floating ground (floating GND) state to a receiving signal in a normal ground state (good ground).

Also, the touch input device can restore a receiving signal in a floating ground (floating GND) state to a receiving signal in a normal ground state (good ground) with minimal additional driving time and power consumption.

BRIEF DESCRIPTION OF THE FIGURES

FIG. 6 shows that when the touch input device modes is in a floating ground state, and the thumb touch (Thumb) of FIG. 3 is applied to the touch surface of the touch input device, the control unit operates the touch sensor 150 as shown in FIG. 4 (this is a diagram to explain receiving signals obtained by operating) in various driving according to an embodiment of the present invention.

DETAILED DESCRIPTION

Figure 1:
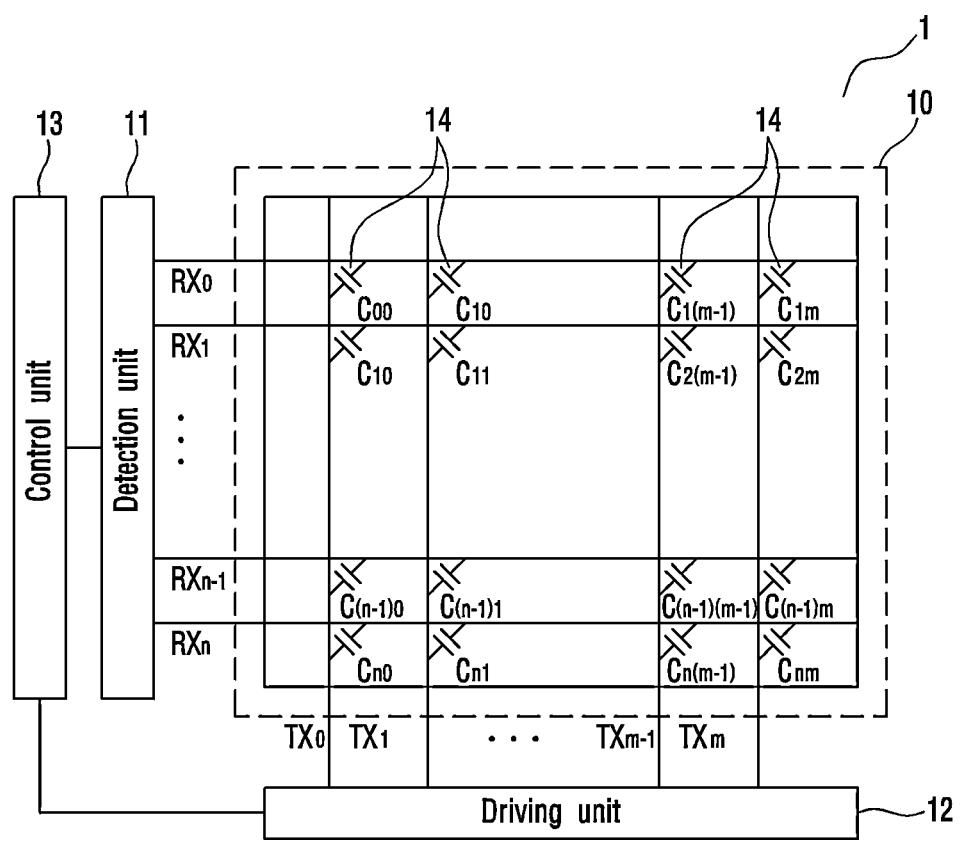
FIG. 1 shows that a schematic diagram illustrating a touch input device according to an embodiment of the present invention.

The detailed description of the present invention described below refers to the accompanying drawings, which show by way of example specific embodiments in which the present invention may be practiced. These embodiments are described in sufficient detail to enable ordinary skilled person in the art to practice the invention.

It should be understood that the various embodiments of the present invention are different from one another but are not necessarily mutually exclusive. For example, specific shapes, structures, and characteristics described herein may be implemented in one embodiment or another without departing from the spirit and scope of the invention. Additionally, it should be understood that the location or arrangement of individual components within each disclosed embodiment may be changed without departing from the spirit and scope of the present invention.

Accordingly, the detailed description that follows is not intended to be limiting, and the scope of the present invention, if properly described, is limited only by the appended claims together with all equivalents to what those claims assert. Similar reference numbers in the drawings refer to identical or similar functions across various aspects.

Touch input devices according to various embodiments of the present document are electronic devices, such as smartphones, tablet personal computers, vehicle display devices, mobile phones, video phones, e-book readers, and personal laptops. It may include at least one of a computer, netbook computer, mobile medical device, camera, or wearable device. Here, the wearable device may be accessory-type (e.g., a watch, ring, bracelet, anklet, necklace, glasses, contact lenses, or head-mounted-device (HMD)), fabric- or clothing-integrated (e.g., electronic clothing), or body-worn (e.g., electronic clothing). It may include at least one of (e.g., skin pad or tattoo), or implantable circuit.

FIG. 1 is a schematic diagram of a touch input device according to an embodiment of the present invention.

Referring to FIG. 1, a touch input device 1 may include a touch sensor 10, a detection unit 11, a driving unit 12, and a control unit 13 according to an embodiment of the present invention.

The driving unit 12 applies a driving signal (or TX signal) to the touch sensor 10 under the control of the control unit 13, and thdpe detection unit 11 receives a detection signal (or RX signal) received from the touch sensor 10.

The driving unit 12 may sequentially supply driving signals to a plurality of driving electrodes of the touch sensor 10. Alternatively, the driving unit 12 may simultaneously supply a driving signal to at least two of the plurality of driving electrodes of the touch sensor 10.

The detection unit 11 receives signals output from a plurality of receiving electrodes of the touch sensor 10. Here, the signal may include information of the amount of change in capacitance between adjacent driving electrodes and receiving electrodes, an LGM noise signal, and a display noise signal.

The detection unit 11 may output convert signals which is converted from the output from a plurality of receiving electrodes by analog-to-digital conversion. For this purpose, the detection unit 11 may include a comparator and an ADC.

The control unit 13 can determine if the touch is being touched and/or its position based on the digital signal output from detection unit 11, whether it is in a floating ground state, and the shape of the touch object, and so on.

In FIG. 1, the detection unit 11, the driving unit 12, and the control unit 13 are shown separately for convenience of explanation, but the present invention is not limited thereto. For example, at least one or two of the detection unit 11, the driving unit 12, and the control unit 13 may be implemented as at least one or two module(s), unit(s), or chip(s), and the detection unit 11 and the driving unit 12 and the control unit 13 may be integrated into a single module, unit, or chip.

The touch input device 1 shown in FIG. 1 may include a display panel. In this case, the touch sensor 10 may be disposed on the display panel or within the display panel. In some cases, the touch sensor 10 may also be disposed below the display panel.

The touch input device 1 shown in FIG. 1 may include a display panel. In this case, the touch sensor 10 may be disposed on the display panel or within the display panel. In some cases, the touch sensor 10 may also be disposed below the display panel.

As an example, the touch sensor 10 is located on the outer surface (e.g., the upper surface of the upper substrate or the lower surface of the lower substrate) or the inner surface (e.g., the lower surface of the upper substrate or the lower substrate) of the display panel. It can be formed directly on the upper surface. The touch sensor 10 can be combined with the display panel to form a touch screen.

The touch sensor 10 includes a plurality of electrodes of a predetermined shape, and the predetermined electrodes include a plurality of first electrodes and a plurality of second electrodes. Here, when a driving signal is applied to the plurality of first electrodes, the plurality of first electrodes can become a plurality of driving electrodes (TX0, TX1, TX2, . . . , TXm), and the plurality of second electrodes may become a plurality of receiving electrodes (RX0, RX1, RX2, . . . , RXn).

A plurality of driving electrodes (TX0, TX1, TX2, . . . , TXm) and a plurality of receiving electrodes (RX0, RX1, RX2, . . . , RXn) may be arranged to intersect each other. Between the plurality of driving electrodes (TX0, TX1, TX2, . . . , TXm) and the plurality of receiving electrodes (RX0, RX1, RX2, . . . , RXn), especially at the intersection thereof, a predetermined mutual Capacitances (14, C00, C10, . . . , Cnm) may be formed.

Each of the driving electrodes (TX0, TX1, TX2, . . . , TXm) is configured in the first axis direction, and each receiving electrode (RX0, RX1, RX2, . . . , RXn) is configured in a direction different from the first axis. It may be configured in the second axis direction. Here, the second axis direction may be perpendicular to the first axis direction.

A plurality of driving electrodes (TX0, TX1, TX2, . . . , TXm) and a plurality of receiving electrodes (RX0, RX1, RX2, . . . , RXn) may be disposed together on the same layer (1 layer). They can be disposed in different double layers (2 layers). Additionally, some of the plurality of driving electrodes (TX0, TX1, TX2, . . . , TXm) may be disposed on different layers from the others, and some of the plurality of receiving electrodes (RX0, RX1, RX2, . . . , RXn) may also be disposed on different layer from the others. A plurality of driving electrodes (TX0, TX1, TX2, . . . , TXm) and a plurality of receiving electrodes (RX0, RX1, RX2, . . . , RXn) can be a diamond pattern, circular, oval, or polygonal structure.

A plurality of driving electrodes (TX0, TX1, TX2, . . . , TXm) and a plurality of receiving electrodes (RX0, RX1, RX2, . . . , RXn) may be made of a metal mesh. These plurality of driving electrodes (TX0, TX1, TX2, . . . , TXm) and plurality of receiving electrodes (RX0, RX1, RX2, . . . , RXn) can be patterned on the TFE (Thin Film Encapsulation) layer of the display panel.

Figure 2:
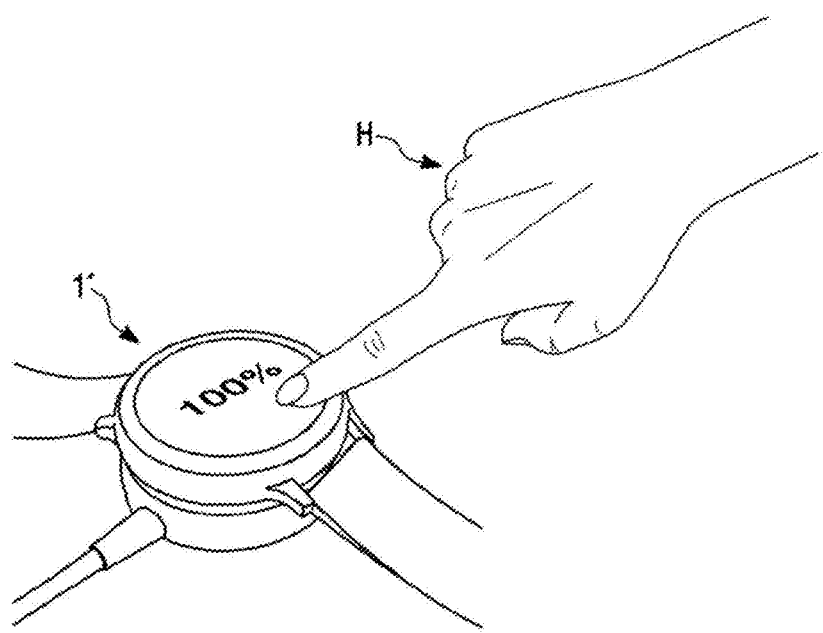
FIG. 2 shows that an embodiment of the touch input device 1 shown in FIG. 1 and it is a diagram to explain an embodiment of the touch input device 1' which is disposed in a floating ground state (or LGM state).

FIG. 2 illustrates an example of the touch input device 1' from FIG. 1, providing an example of the device in a floating ground state (or LGM state).

Referring to FIG. 2, the touch input device 1' is in a floating ground state when disposed on a desk or wireless charger without being connected to a power cable while the user operates it by touching the screen with their hand (H). In this floating ground state, the detected touch signal splits or disappears differently from the normal ground state, and the touch input device 1' causes a touch malfunction that is different from the user's intention. Specifically, it will be described with reference to FIG. 3.

Figure 3:
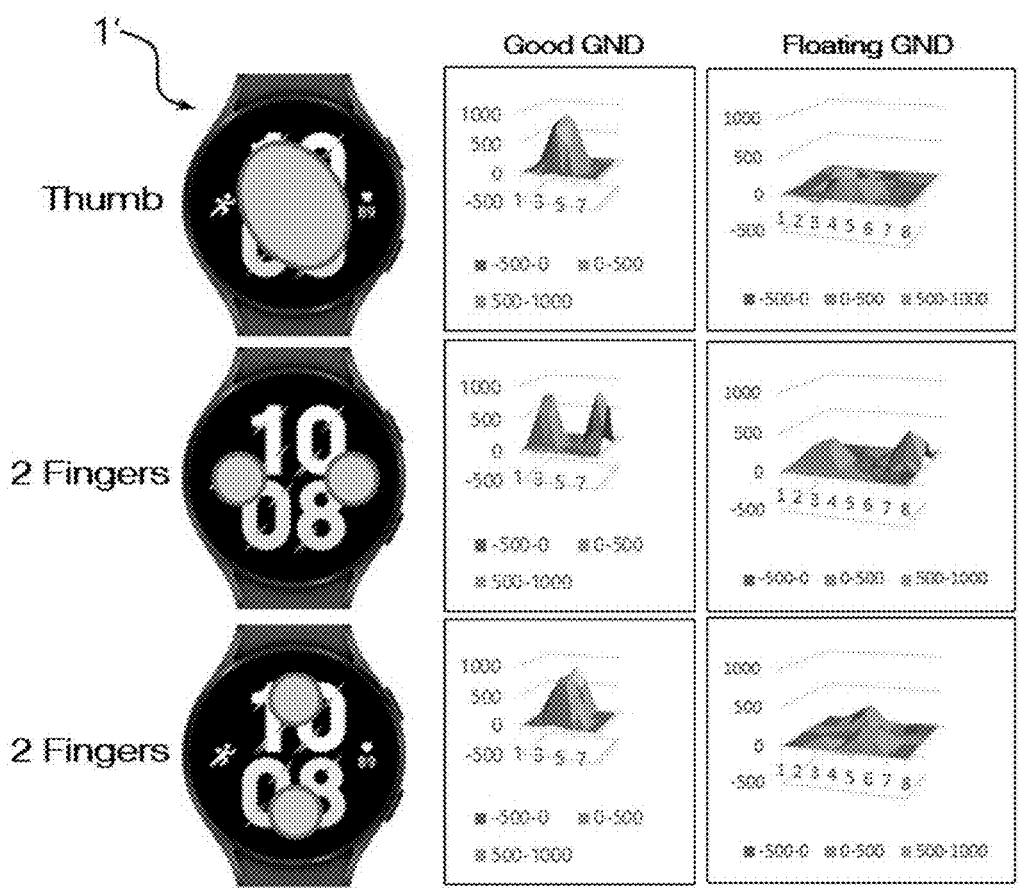
FIG. 3 shows that a graph of the amount of change in capacitance detected in the control unit of the touch input device 1' when the touch input device 1' illustrated in FIG. 2 is in a normal ground state (Good GND) and in a floating GND state (Floating GND) by each touch operation (Thumb, 2 Fingers).

FIG. 3 shows the amount of change in capacitance detected in the control unit in the touch input device 1' shown in FIG. 2 as a graph, about each touch operations (Thumb, 2 Fingers), when it is in a normal ground state (Good GND) and a floating ground state (Floating GND).

Referring to FIG. 3, the touch operation on the touch surface of the touch input device 1' may be a thumb touch and two multi touches (2 Fingers) of the vertical direction, or two multi touches (2 Fingers) of the horizontal direction.

Under the floating ground (Floating GND) state for each touch operations, comparing with the normal ground (Good GND) state, the receiving signal of thumb touch (Thumb) or multi touch (2 Fingers) to a control unit is occurred that the size of the signal is attenuated and spitted. This attenuation and splitting of the receiving signal causes malfunction of the touch input device 1'.

The structure of a touch input device that can solve the problem of malfunction of the touch input device in this floating ground state and a touch sensor that can be used in the touch input device will be described below.

Figure 4:
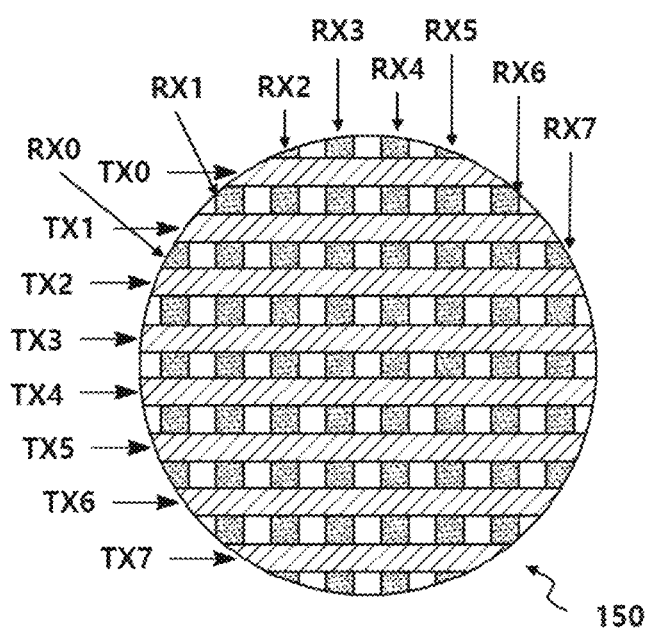
FIG. 4 is a drawing shows a pattern structure of the touch sensor 150 included in the touch input device 1' shown in FIG. 2.

FIG. 4 depicts a pattern structure of touch sensor 150 included in the touch input device 1' illustrated in FIG. 2.

The pattern structure of the touch sensor 150 shown in FIG. 4 includes a plurality of first electrodes (TX0, TX1, TX2, TX3, TX4, TX5, TX6, TX7) and a plurality of second electrodes (RX0, RX1, RX2, RX3, RX4, RX5, RX6, RX7) are disposed on a different layer.

Here, the predetermined shape can be a shape extending long along the row direction as shown in FIG. 4, or, although not shown in the drawing, a plurality of diamond patterns can be electrically connected by a bridge or connection pattern.

Each of the second electrodes (RX0, RX1, RX2, RX3, RX4, RX5, RX6, RX7) has a predetermined shape along the column direction (or second direction), and a plurality of second electrodes (RX0, RX1, RX2, RX3, RX4, RX5, RX6, RX7) are arranged in a row along the row direction. Here, the predetermined shape may be a shape extending long along the column direction as shown in FIG. 4, or, although not shown in the drawing, a plurality of diamond patterns may be electrically connected by a bridge or connection pattern.

A plurality of first electrodes (TX0, TX1, TX2, TX3, TX4, TX5, TX6, TX7) and a plurality of second electrodes (RX0, RX1, RX2, RX3, RX4, RX5, RX6, RX7) are arranged orthogonal to each other. (Hereinafter referred to as an 'orthogonal pattern'). Here, it is illustrated that the first electrode shown as the driving electrode to receive a driving signal, while the second electrode shown as the sensing electrode (or receiving electrode) to output a sensing signal (or receiving signal). However, the configurations can be reversed.

Meanwhile, although not shown in separate drawings, a portion of the plurality of first electrodes and a portion of the plurality of second electrodes may be disposed together on the same layer. For example, the first electrode and the second electrode may include a rhombus (or diamond)-shaped pattern, and the diamond-shaped pattern of the plurality of first electrodes and the diamond-shaped pattern of the plurality of second electrodes can be disposed on the same layer together. Additionally, it can be applied to touch sensors for smartphones, touch sensors for tablet PCs, and touch sensors for TVs.

Figure 5:
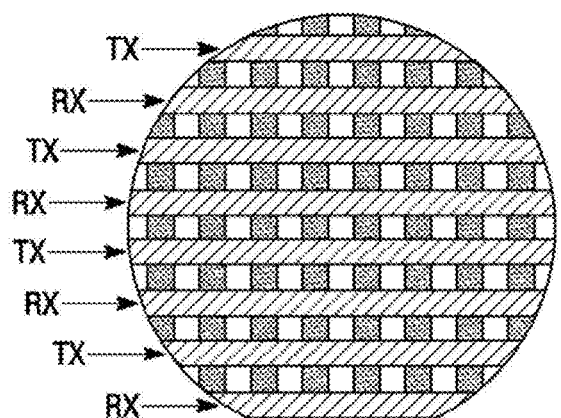
FIG. 5 is a drawing for explaining a touch driving method of the touch input device 1' shown in FIG. 4.
Figure 5:
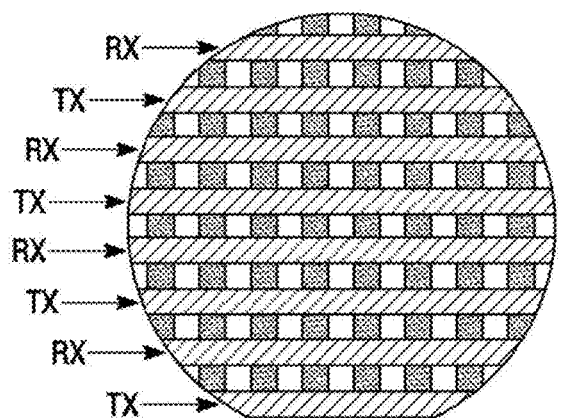

Referring to FIG. 5, the touch driving method of the touch input device according to an embodiment of the present invention include a driving mode in which the control unit of the touch input device operates to control to apply a predetermined driving signal (TX) to at least one first electrodes of a plurality of first electrodes (TX0, TX1, TX2, TX3, TX4, TX5, TX6, and TX7), and a receiving signal (RX) is received from at least one other first electrode to which the driving signal (TX) is not applied. Conventionally, after a driving signal is applied to a plurality of first electrodes (TX0, TX1, TX2, TX3, TX4, TX5, TX6, TX7), the receiving signal is transmitted to a plurality of second electrodes (RX0, RX1, RX2, RX3, RX4, RX5, RX6, RX7). But, according to the touch driving method of a touch input device according to an embodiment of the present invention, in mutual mode, a driving signal is applied to at least one first electrode among the plurality of first electrodes (TX0, TX1, TX2, TX3, TX4, TX5, TX6, TX7) to which a driving signal is applied, and a signal is received from at least one other first electrode to which the driving signal is not applied.

Meanwhile, optionally, in the driving mode of the touch driving method of a touch input device according to the embodiment of the present invention, the control unit may control the plurality of second electrodes (RX0, RX1, RX2, RX3, RX4, RX5, RX6, RX7) to apply a predetermined driving signal (TX) to at least one second electrode, and a receiving signal (RX) may be received from at least one other second electrode to which a driving signal (TX) is not applied.

In the driving mode, as shown in FIG. 5, a control unit may perform scan A and scan B respectively to obtain each receiving signal (RX) from all of the plurality of first electrodes (TX0, TX1, TX2, TX3, TX4, TX5, TX6, TX7).

For example, firstly referring to scan A, the control unit may apply a driving signal TX to the first electrodes of the first group which is located at odd numbers along the column direction among the plurality of first electrodes (TX0, TX1, TX2, TX3, TX4, TX5, TX6, TX7), and a receiving signal RX may be received from the first electrodes of the second group located in even numbers.

Next, referring to scan B, the control unit apply a driving signal (TX) to the first electrodes of the second group located in even numbers along the column direction among a plurality of first electrodes (TX0, TX1, TX2, TX3, TX4, TX5, TX6, TX7), the receiving signal RX may be received from the first electrodes of the first group located in odd numbers.

In this way, when scan A and scan B are performed, the control unit can receive a receiving signal (RX) from all of the plurality of first electrodes (TX0, TX1, TX2, TX3, TX4, TX5, TX6, TX7).

Here, as shown in FIG. 5, some of the first electrodes (of the first group) and the remaining first electrodes (of the second group) may be arranged alternately one by one in the plurality of first electrodes, or two or more may be arranged alternately. In a similar manner, some of the second electrodes (of the first group) and the remaining second electrodes (of the second group) may be arranged alternately one by one in the plurality of second electrodes, or two or more may be arranged alternately.

Based on the receiving signals (RX) obtained through the driving mode, the control unit can determine whether the touch input device is in a floating ground state and determine how the floating ground state is serious.

In addition, the control unit can restore a mutual receiving signal in the floating ground state to a mutual receiving signal corresponding to the normal ground state, based on receiving signals (RX) obtained through a driving mode and based on self-receiving signals obtained through the self-driving mode. This will be described later with reference to FIG. 6.

Meanwhile, although not shown in a drawing, the control unit can also be sets the driving mode to use a plurality of second electrodes (RX0, RX1, RX2, RX3, RX4, RX5, RX6, RX7) rather than a plurality of first electrodes (TX0, TX1, TX2, TX3, TX4, TX5, TX6, TX7). For example, firstly, as scan A, the control unit applies a driving signal TX to the second electrodes of the first group located at odd numbers along the row direction among the plurality of second electrodes (RX0, RX1, RX2, RX3, RX4, RX5, RX6, and RX7), a receiving signal RX may be received from the second electrodes of the second group located in even numbers. Next, as scan B, the control unit applies a driving signal TX to second electrodes of the second group located at even numbers along the row direction among the plurality of second electrodes (RX0, RX1, RX2, RX3, RX4, RX5, RX6, RX7), a receiving signal RX may be received from the second electrodes of the first group located in odd numbers. In this way, the control unit can conduct a driving mode to a plurality of first electrodes (TX0, TX1, TX2, TX3, TX4, TX5, TX6, TX7) or a plurality of second electrodes (RX0, RX1, RX2, RX3, RX4, RX5, RX6, RX7).

FIG. 6 shows a diagram for explaining, when the touch input device is in a floating ground state and where the thumb touch (Thumb) of FIG. 3 is applied to the touch surface of the touch input device, a control unit operating the touch sensor 150 shown in FIG. 4 in various driving modes according to an embodiment of the present invention.

A first receiving signal (a) of FIG. 6 is a receiving signal obtained from a plurality of second electrodes (RX0, RX1, RX2, RX3, RX4, RX5, RX6, and RX7) when the control unit simultaneously or sequentially drives a driving signal to the plurality of first electrodes (TX0, TX1, TX2, TX3, TX4, TX5, TX6, and TX7) of the touch sensor 150. The first receiving signal (a) is a mutual receiving signal, and the first receiving signal (a) is a receiving signal obtained when the control unit operates the touch sensor 150 in a mutual driving mode. Here, various digital values of the first receiving signal (a) may be obtained by the control unit converts receiving signals from a plurality of second electrodes (RX0, RX1, RX2, RX3, RX4, RX5, RX6, RX7) into analog-to-digital conversion.

The various digital values correspond to the amount of change in capacitance at the intersection point of a plurality of first electrodes (TX0, TX1, TX2, TX3, TX4, TX5, TX6, TX7) and a plurality of second electrodes (RX0, RX1, RX2, RX3, RX4, RX5, RX6, RX7).

A second receiving signal (b) of FIG. 6 is a receiving signal obtained from a plurality of first electrodes (TX0, TX1, TX2, TX3, TX4, TX5, TX6, TX7) and a plurality of second electrodes (RX0, RX1, RX2, RX3, RX4, RX5, RX6, RX7) when control unit applies a driving signal to each of the plurality of first electrodes (TX0, TX1, TX2, TX3, TX4, TX5, TX6, TX7) and each of the plurality of second electrodes (RX0, RX1, RX2, RX3, RX4, RX5, RX6, RX7) of the touch sensor 150. The second receiving signal (b) is a self-receiving signal, which is a receiving signal obtained when the control unit operates the touch sensor 150 in self-driving mode. Here, the digital values (−14, 51, 94, 102, 78, 9, −15, −17) listed along the vertical direction among the several digital values of the second receiving signal (b) are obtained when the control unit converts self-receiving signals received from a plurality of first electrodes (TX0, TX1, TX2, TX3, TX4, TX5, TX6, TX7) by analog-to-digital conversion, and the digital values (−8, −1, 100, 147, 114, −16, −4, −7) listed along the horizontal direction may have been obtained through analog to digital conversion of self-receiving signals received from a plurality of second electrodes (RX0, RX1, RX2, RX3, RX4, RX5, RX6, RX7).

A third receiving signal (c) in FIG. 6 is a receiving signal obtained through the driving mode previously described with reference to FIG. 5, a control unit can receive signals from a plurality of first electrodes (TX0, TX1, TX2, TX3, TX4, TX5, TX6, TX7) by driving the touch sensor 150 in the above driving mode, and the control unit can convert the receiving signals by analog to digital.

The control unit can determine whether the touch input device is in a floating ground state or in a normal ground state from the sign of the third receiving signal (c). For example, when the sign of the third receiving signal (c) is negative (−), the control unit may determine that the touch input device is in a floating ground state, when the sign is positive (+), it can be determined that the touch input device is in a normal ground state. In the case of FIG. 6, since the signs of the digital values of the third receiving signal (c) are all negative (−), a control unit may determine that the touch input device is currently in a floating ground state.

The control unit can determine the severity of the floating ground state of the touch input device based on the magnitude of the third receiving signal (c). For example, as the magnitude of the digital value with the largest absolute value (e.g., 440) among several digital values of the third receiving signal (c) increases, the floating ground condition may be determined to be more serious. The magnitude (severity) of the floating ground condition may be determined according to one or more predetermined preset thresholds. In other words, the threshold can be a boundary that separates the levels of the magnitude (severity).

The control unit may determine the number of touch objects from the second receiving signal (b). For example, it can be determined whether there is one touch object or more than two touch objects from the second receiving signal (b). In the case of FIG. 6, since the tendency of the digital values of the second receiving signal (b) on each of the horizontal and vertical axes forms a curve that is generally convex upward, the control unit can determine that there is one touch object.

The control unit may determine the shape of the projected touch from the second receiving signal (b) with projected onto a plurality of first electrodes that are horizontal axis electrodes and a plurality of second electrodes that are vertical axis electrodes. In the case of FIG. 6, according to the digital values of the second receiving signal (b), the control unit can determine the shape of the touch object by the 1-1 electrode (TX1) with the 1-5 electrode (TX5) on the vertical axis and the 2-2 electrode (RX2) to 2-4 electrode (RX4) on the horizontal axis.

The control unit may determine the shape of the touch object projected on the horizontal axis electrodes from the third receiving signal (c). Here, since the third receiving signal (c) is received from a plurality of first electrodes that are horizontal axis electrodes, only the shape of the touch object projected on the horizontal axis electrodes can be identified.

The control unit restores a mutual receiving signal in the floating ground state into a mutual receiving signal in the normal ground state with the shape of the touch object in the floating ground state as well as based on the second receiving signal (b) and the third receiving signal (c). While restoration, the control unit can determine the magnitude of the compensation signal that should be compensated for the mutual receiving signal in the floating ground state. Here, the control unit can use any one of several combinations as shown in <Table 1> below to restore a receiving signal in the floating ground state to a receiving signal in the normal ground state.

TABLE 1

Signal restoration combination

| | Horizontal axis electrode | vertical axis electrode | Note |
|---|---|---|---|
| 1 | Third receiving signal (c) | Second receiving signal (b) | — |
| 2 | Second receiving signal (b) | Third receiving signal (c) | — |
| 3 | Third receiving signal (c) | Third receiving signal (c) | However, the driving time increases by twice compared to combination No. 1 or combination No. 2. |

Figure 7:
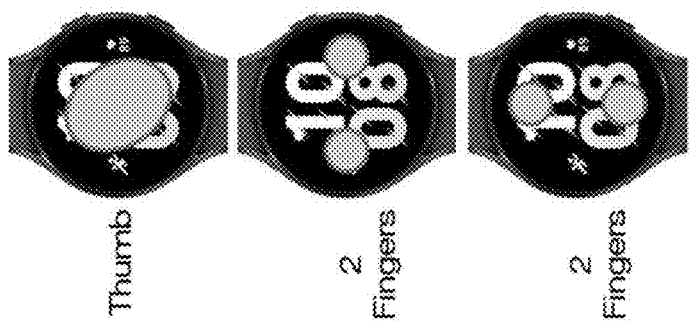
FIG. 7 is a drawing to explain the result of restoring the mutual receiving signal with combination 1 of the Table 1.

FIG. 7 is a diagram to explain the result of restoring a mutual receiving signal with combination No. 1 in the Table 1 above.

Referring to FIG. 7, after restoring a mutual receiving signal in a floating ground state into a mutual receiving signal in a normal ground state by a control unit, it can be seen that the corrected digital values of the mutual receiving signal in the floating ground state have a very similar tendency, it not the same though, with the digital values of the mutual receiving signal in the normal ground state.

Figure 8:
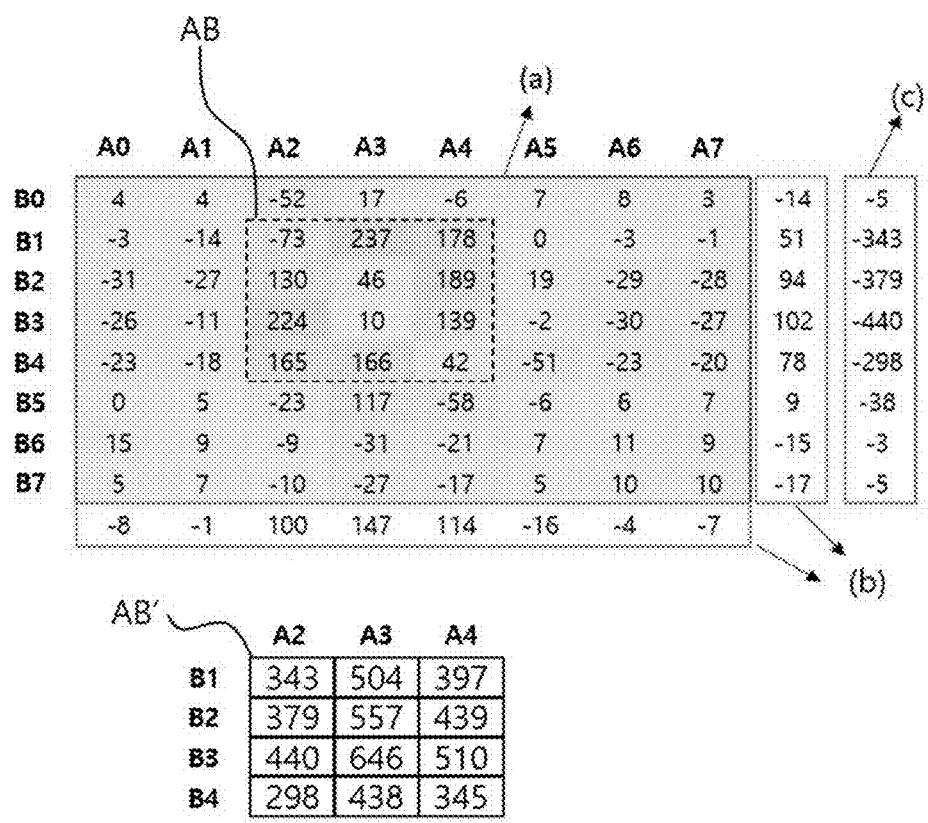
FIG. 8 is a drawing to explain a method of restoring a mutual receiving signal of a floating ground state to a mutual receiving signal of a normal ground state.

Referring to FIG. 8, a method, when a control unit receives a first to third receiving signals (a, b, c) shown in FIG. 6, for the control unit to restore a mutual receiving signal in a floating ground state into a mutual receiving signal in a normal ground state is explained below.

FIG. 8 is a diagram illustrating a method of restoring a mutual receiving signal in a floating ground state into a mutual receiving signal in a normal ground state.

The control unit calculates the ratio of digital values greater than a preset threshold among the digital values of a second receiving signal (b) received from a plurality of second electrodes, which are vertical axis electrodes. For example, if a threshold is 50, calculate the ratio (1:1.47:1.14) of digital values (100, 147, 114) of columns A2, A3, and A4 that are greater than the threshold value of 50 among a digital values of a second receiving signal (b) of FIG. 8.

The control unit changes a sign of the digital values of a third receiving signal (c) to positive (+) and selects digital values greater than a preset threshold from among the changed digital values. For example, if a threshold is 50, select digital values (343, 379, 440, 298) in rows B1, B2, B3, and B4 that are greater than the threshold of 50 among the digital values of the third receiving signal (c) whose sign has been changed in FIG. 8.

The control unit restores the digital values (AB) which are commonly included in columns (A2, A3, A4) to which the ratio (1:1.47:1.16) is assigned and the rows (B1, B2, B3, B4) which correspond to the selected digital values (343, 379, 440, 298) to the digital values of a first receiving signal in a normal ground state. Here, as an example of restoring method, the corresponding digital value (e.g. −73) in the digital values (AB) is replaced by a value which is an obtained value by multiplying a ratio (1) of a second receiving signal (b) of column (A2) to which the corresponding digital value belongs to a positive digital value (343) of a third receiving signal (c) of the row (B1) to which the corresponding digital value belongs. In this method, when all the digital values (AB) are changed, modified digital signal values (AB') can be obtained. In this way, when the digital values (AB) among the mutual receiving signals in a floating ground state are changed into the modified digital values (AB'), it can be obtained that a graph such as the floating ground state after correction (Flatting GND (after correction)). These graphs are not the same as the normal ground state (Good GND), but they have similar tendencies, the control unit can accurately recognize the user's touch when the touch input device is in the floating ground state by the above-described restoration process.

Figure 9:
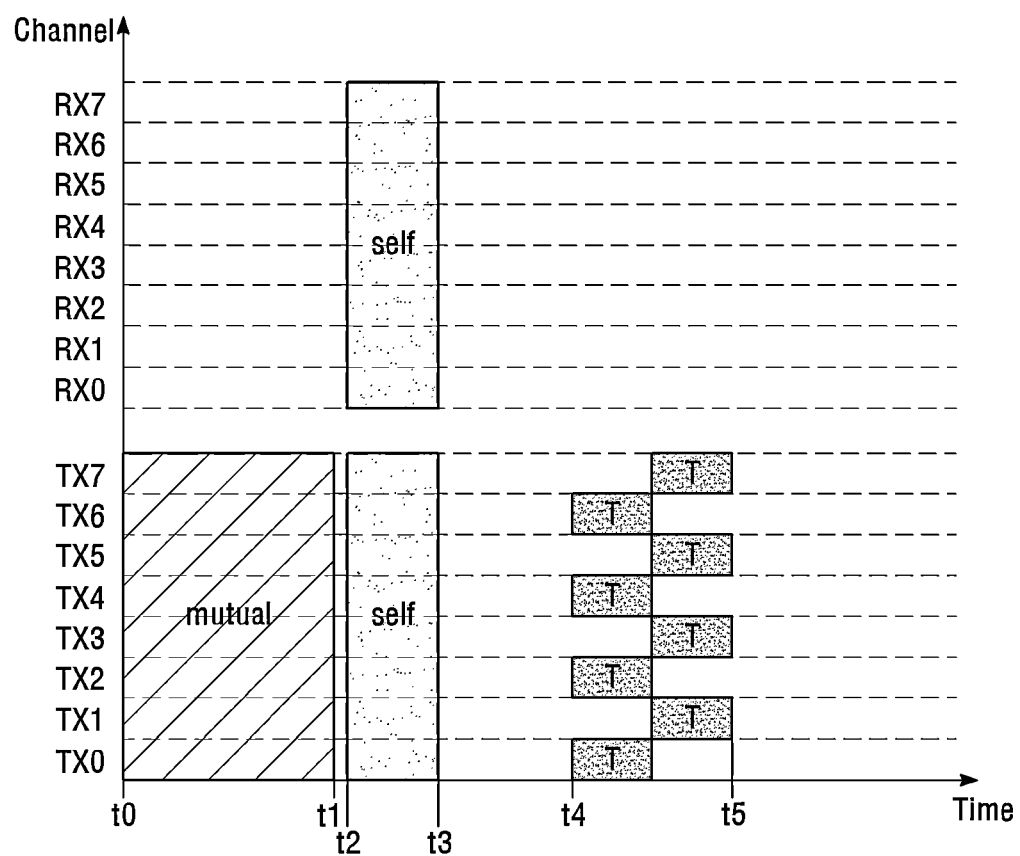
FIG. 9 is a graph illustrating the control unit of the touch input device drives the touch sensor 150 of FIG. 4 as a first driving method according to an embodiment of the present invention.

FIG. 9 is a graph illustrating a first driving method in which a control unit of the touch input device drives the touch sensor 150 of FIG. 4 according to an embodiment of the present invention.

Referring to FIG. 9, the control unit can drive the touch sensor 150 as various modes.

First, the control unit operates a touch sensor 150 as a mutual mode in the first time period (t0 to t1), operates the touch sensor 150 as a self-mode in the second time period (t2 to t3), and operates the touch sensor 150 as a self-mode in the third time period (t2 to t3). In the time interval t4 to t5, the plurality of first electrodes TX0, TX1, . . . TX7 of the touch sensor 150 may be operated in the driving mode as described above in FIG. 5. Those driving method can correspond to combination No. 1 in <Table 1> above.

Figure 10:
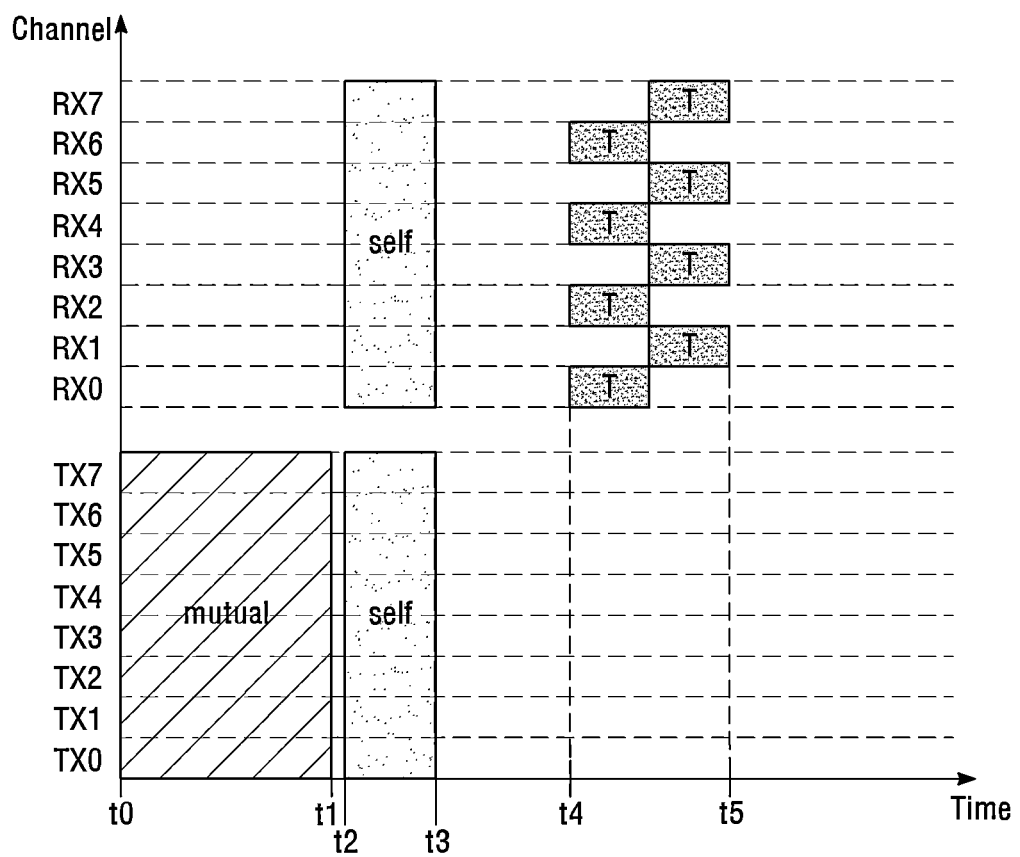
FIG. 10 is a graph illustrating the control unit of the touch input device drives the touch sensor 150 of FIG. 4 as a second driving method according to an embodiment of the present invention.

FIG. 10 is a graph illustrating a second driving method in which a control unit of the touch input device drives the touch sensor 150 of FIG. 4 according to an embodiment of the present invention.

Referring to FIG. 10, the control unit can drive the touch sensor 150 as various modes. First, the control unit operates the touch sensor 150 as a mutual mode in the first time period (t0 to t1), and operates the touch sensor 150 as a self-mode in the second time period (t2 to t3), and in the third time period (t4 to t5), the plurality of second electrodes (RX0, RX1, . . . , RX7) of the touch sensor 150 can be operated as a driving mode described above in FIG. 5. Those driving method can correspond to combination No. 2 in <Table 1> above.

Figure 11:
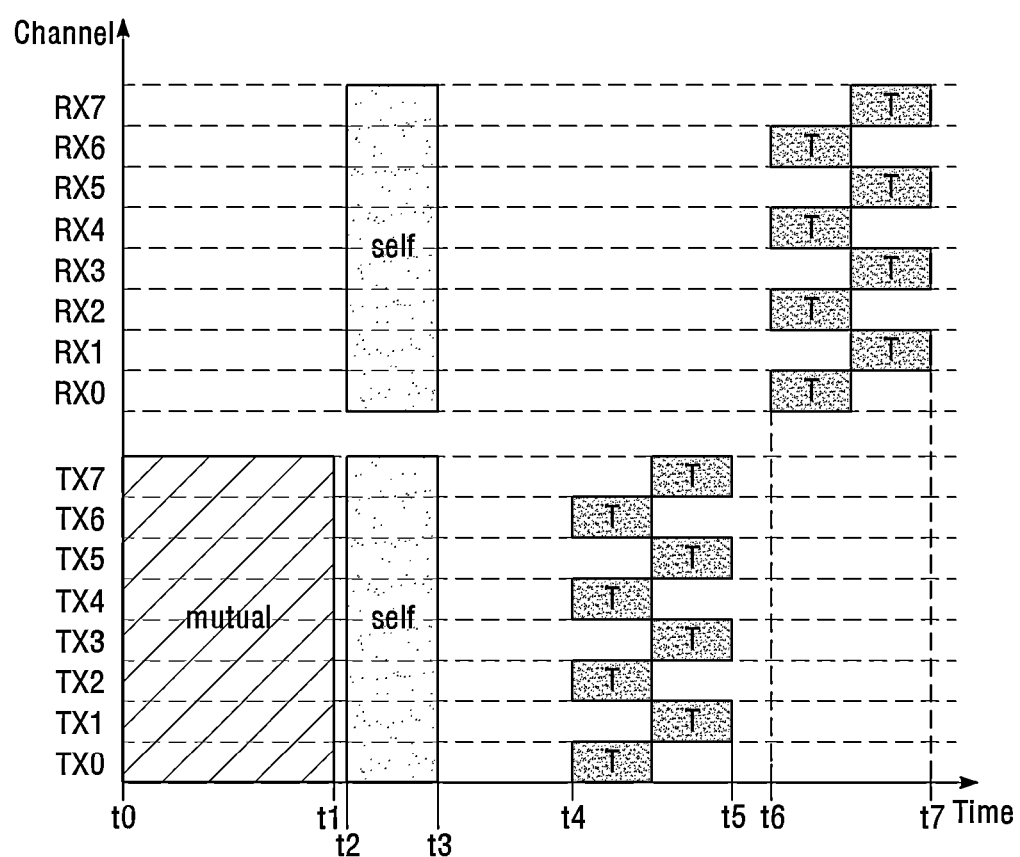
FIG. 11 is a graph illustrating the control unit of the touch input device drives the touch sensor 150 of FIG. 4 as a third driving method according to an embodiment of the present invention.

FIG. 11 is a graph illustrating a third driving method in which a control unit of the touch input device drives a touch sensor 150 of FIG. 4 according to an embodiment of the present invention.

Referring to FIG. 11, the control unit can drive the touch sensor 150 as various modes. First, the control unit operates a touch sensor 150 as a mutual mode in the first time period (t0 to t1), and operates the touch sensor 150 as a self-mode in the second time period (t2 to t3). and in the third time period (t4 to t5), a plurality of first electrodes (TX0, TX1, . . . TX7) of the touch sensor 150 are operated in the driving mode as described above in FIG. 5, and in the fourth time period, in the period t6-t7, the plurality of second electrodes RX0, RX1, . . . , RX7 of the touch sensor 150 may be operated as a driving mode described above in FIG. 5. This driving method can correspond to combination No. 3 in <Table 1> above.

According to the embodiment of the present invention shown in FIGS. 9 to 11, the first to third driving methods of the touch input device perform an additional driving mode besides the mutual mode and the self-mode, and also it can be using a receiving signal obtained from a driving mode, and determine whether the input device is in a floating ground state, how an magnitude(severity) is strong, and the shape of the touch object. Furthermore, a mutual receiving signal in the floating ground state can be restored to a mutual receiving signal in the normal ground state. In addition, the shape of the touch object can be determined through combination with the receiving signal obtained through self-mode, and a mutual receiving signal in the floating ground state can be restored to the mutual receiving signal in the normal ground state.

The features, structures, effects, etc. described in the embodiments above are included in one embodiment of the present invention and are not necessarily limited to only one embodiment. Furthermore, the features, structures, effects, etc. illustrated in each embodiment can be combined or modified and implemented in other embodiments by a person with ordinary knowledge in the field to which the embodiments belong. Therefore, contents related to such combinations and modifications should be construed as being included in the scope of the present invention.

In addition, although the above description focuses on the embodiment, this is only an example and does not limit the present invention, and ordinary skilled in the art could understand the above without departing from the essential characteristics of the present embodiment and could be possible various modifications and applications not illustrated.

In addition, although the above description focuses on the embodiment, this is only an example and does not limit the present invention, and ordinary skilled in the art could understand the above without departing from the essential characteristics of the present embodiment and could be possible various modifications and applications not illustrated. For example, each component specifically shown in the embodiments can be modified and implemented. And these variations and differences in application should be construed as being included within the scope of the present invention as defined in the appended claims.

What is claimed is:

1. A touch input device comprising:
a touch sensor including a plurality of first electrodes and a plurality of second electrodes; and
a control unit configured to control the touch sensor, wherein the control unit is configured to:
calculate a ratio of digital values greater than a first threshold value among the self-receiving signals from the plurality of second electrodes,
change signs of the digital values of the first and second receiving signals from the plurality of first electrodes to positive digital values,
select some of digital values greater than a second threshold value among the positive digital values, and
multiply each of the some digital values by the ratio to change the values of the at least some of the mutual receiving signals;
wherein the plurality of first electrodes is arranged along a first direction, and each of the first electrodes has a predetermined shape along a second direction different from the first direction;
wherein the plurality of second electrodes is arranged along the second direction, and each second electrode has a predetermined shape along the first direction;
wherein the control unit controls the touch sensor to be driven as in a mutual mode, a self mode and a predetermined driving mode in different time periods;
wherein in the mutual mode, the control unit controls a mutual driving signal to be applied to the plurality of first electrodes, and receives mutual receiving signals from the plurality of second electrodes,
wherein in the self-mode, the control unit controls a self-driving signal to be applied to each of the plurality of first electrodes and the plurality of second electrodes, and receives a self-receiving signal from each of the plurality of first electrodes and the plurality of second electrodes,
wherein in the predetermined driving mode, the control unit controls:
a driving signal to be applied simultaneously to some of the plurality of first electrodes, and to receive first receiving signals from other remaining first electrodes to which the driving signal is not applied in a first time period; and
the driving signal to be applied simultaneously to the remaining first electrodes, and to receive second receiving signals from the some of first electrodes in a second time period,
wherein the control unit is configured to change the values of at least some of the mutual receiving signals based on the first and second receiving signals from the plurality of first electrodes and the self-receiving signals from the plurality of second electrodes.

2. The touch input device of claim 1, wherein the control unit determines whether the touch input device is a floating ground state based on the first and second receiving signals.

3. The touch input device of claim 1, wherein the control unit determines whether the touch input device is in the floating ground state or in the normal ground state according to the signs of the first and second receiving signals.

4. The touch input device of claim 1, wherein the control unit determines an intensity of the floating ground state according to magnitude of the first and second receiving signals.

5. The touch input device of claim 1, wherein the at least one first electrode and the at least one other first electrode is arranged to alternate along the first direction, and the at least one second electrode and the at least one other second electrode is arranged to alternate along the second direction.

6. The touch input device of claim 1, wherein the plurality of first electrodes and the plurality of second electrodes are disposed together on a same layer.

7. The touch input device of claim 1, wherein the plurality of first electrodes and the plurality of second electrodes are disposed on different layers.

8. A method of touch driving of a touch input device, wherein the touch input device comprises a touch sensor including a plurality of first electrodes and a plurality of second electrodes; and a control unit configured to control the touch sensor, the method comprises steps of:
driving the touch sensor in a mutual mode, a self mode and a predetermined driving mode by the control unit at different time periods; and
changing values of at least some of mutual receiving signals obtained through the mutual mode, wherein the changing comprises:
calculating a ratio of digital values greater than a first threshold value among the self-receiving signals from the plurality of second electrodes,
changing signs of the digital values of the first and second receiving signals from the plurality of first electrodes to positive digital values, selecting some of digital values greater than a second threshold value among the positive digital values, and multiplying each of the some digital values by the ratio to change the values of the at least some of the mutual receiving signals;

wherein in the mutual mode, the control unit controls a mutual driving signal to be applied to the plurality of first electrodes, and receives mutual receiving signals from the plurality of second electrodes, wherein in the self-mode, the control unit controls a self-driving signal to be applied to each of the plurality of first electrodes and the plurality of second electrodes, and receives a self-receiving signal from each of the plurality of first electrodes and the plurality of second electrodes, wherein in the predetermined driving mode, the control unit controls:

a driving signal to be applied simultaneously to some of the plurality of first electrodes, and to receive first receiving signals from remaining first electrodes to which the driving signal is not applied in a first time period, and the driving signal to be applied simultaneously to the remaining first electrodes, and to receive second receiving signals from the some of first electrodes in a second time period, and wherein the control unit is configured to change the values of at least some of the mutual receiving signals based on the first and second receiving signals from the plurality of first electrodes and the self-receiving signals from the plurality of second electrodes.

* * * * *